E. W. DAVIS.
LUBRICATING SYSTEM.
APPLICATION FILED JUNE 3, 1920.

1,401,765.

Patented Dec. 27, 1921.

Inventor:
Ernest W. Davis
Williams, Bradbury,
See & McCaleb, Attys.

UNITED STATES PATENT OFFICE.

ERNEST W. DAVIS, OF OAK PARK, ILLINOIS, ASSIGNOR TO THE BASSICK MANUFACTURING CO., A CORPORATION OF DELAWARE.

LUBRICATING SYSTEM.

1,401,765.  Specification of Letters Patent.  Patented Dec. 27, 1921.

Application filed June 3, 1920. Serial No. 386,153.

*To all whom it may concern:*

Be it known that I, ERNEST W. DAVIS, a citizen of the United States, and resident of Oak Park, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems, and is especially concerned with improvements in that type of lubricating system disclosed in the patent to Arthur V. Gullborg, No. 1,307,734, of June 24, 1919, which comprises a plurality of nipples, or coupling members to be secured to the bearings to be lubricated, and a lubricant compressor having a flexible discharge conduit, provided with a coupling member adapted to be successively detachably connected with the nipples.

The objects of my present invention are:

1st. To provide a lubricating system comprising a nipple and a lubricant compressor, having means for making a detachable connection with the nipple so constructed that the connection between the compressor and the nipple can be made and unmade without the necessity of relieving the pressure upon the lubricant in the compressor as is necessary with the system disclosed in the afore-mentioned patent to Arthur V. Gullborg.

2nd. To provide a system of the character described comprising a coupling member for the compressor so constructed as to prevent the escape of lubricant from the coupling member when it is detached from the nipple, even though the lubricant is maintained under pressure.

3rd. To provide a system of the character described of such construction that the connection between the compressor and the nipple can be easily and quickly established and 4th. To provide a lubricating system of the character described which is simple in construction, reliable and economical to manufacture.

Other objects will appear as this description progresses, reference being had to the accompanying drawings, in which—

Throughout the several views, similar reference characters will be used for referring to similar parts.

Figure 1:
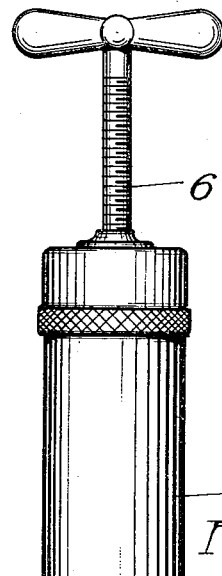
Figure 1 is a side elevation of one embodiment of my improved lubricating system, showing a bearing in cross section, portions of the conduit of the compressor being broken away.
Figure 2:
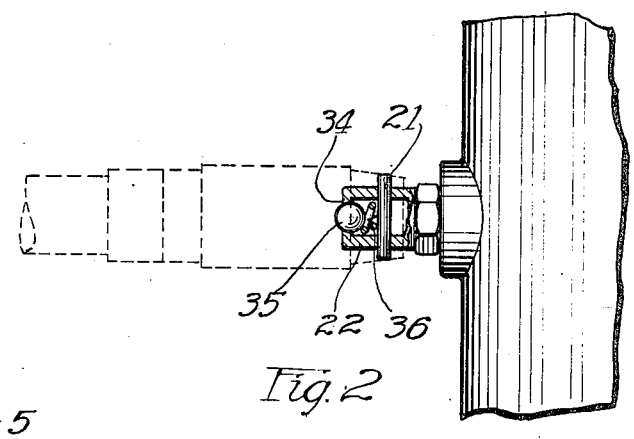
Fig. 2 is a view showing the details of construction of the nipple, and the method of making connection between the nipple and the coupling member of the compressor, the coupling member of the compressor being shown in dotted outline.
Figure 3:
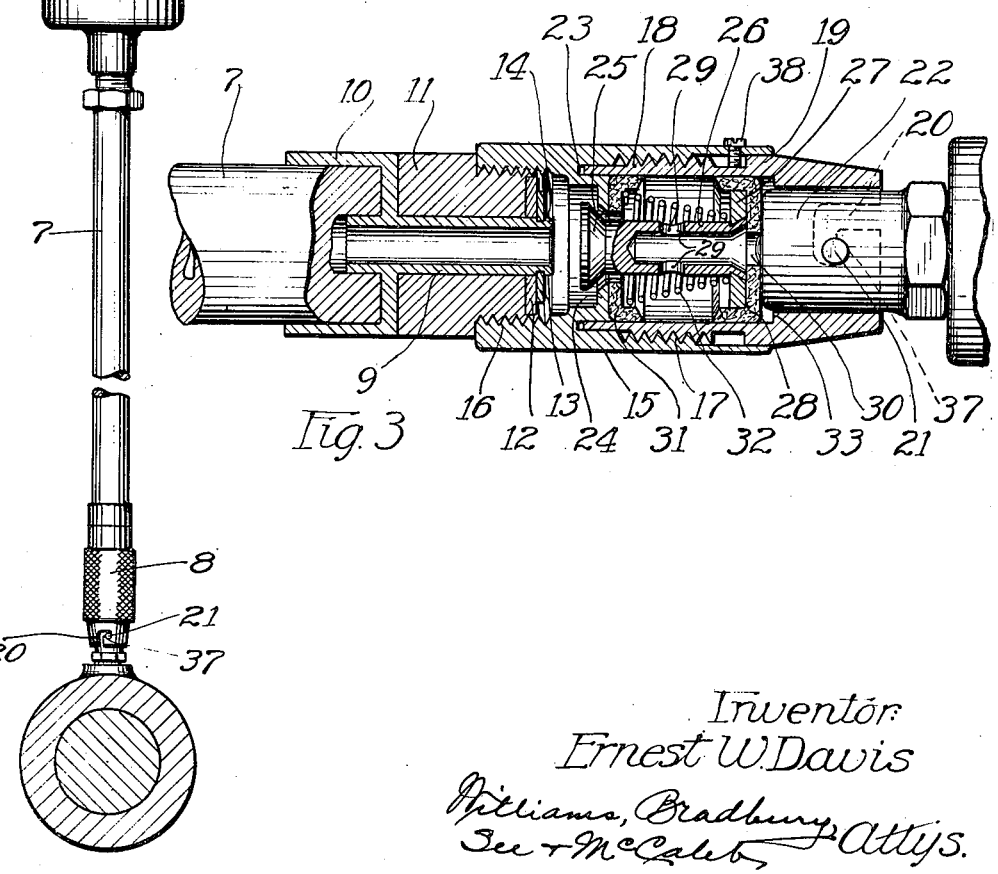
Fig. 3 is a longitudinal section through my improved coupling member.

Referring to the drawings, reference character 5 indicates the barrel of the compressor of my improved lubricating system, which is preferably formed of two parts, as shown, to facilitate the filling thereof, and which comprises a screw threaded piston rod 6, the inner end of which is provided with a plunger (not shown) for expelling the contents of the compressor. The details of construction of this compressor, which are not claimed in this application, are described and claimed in the co-pending application of Douglas F. Fesler, Serial No. 346,098, filed December 19, 1919. The compressor is provided with a flexible discharge conduit 7, the free end of which has secured thereto a coupling member indicated as a whole by the reference character 8.

This coupling member comprises a tubular member 9, which forms a continuation of the passageway through the discharge conduit 7, and which is provided with an enlarged cup-shaped member 10, which can be soldered or otherwise secured to the free end of the discharge conduit. A collar 11 is swiveled upon the tubular member 9, and is prevented from being withdrawn therefrom by the gasket 12, and the washer 13 which is held in place by sledging over the outer end of the tubular member 9, as shown at 14. The gasket 12 seals the joint between the tubular member 9 and the collar 11. The inner end of the sleeve 15 is screw threaded upon the outer end of the collar 11, as shown at 16. It will, of course, be understood that the collar 11 and sleeve 15 could be formed integrally, and that they are separately formed merely to facilitate the manufacture of my improved coupling member.

The outer end of the sleeve 15 is internally threaded as shown at 17 to receive the externally threaded inner end 18 of the second or inner sleeve 19, the outer end of which is provided with oppositely disposed bayonet slots 20, which co-act with the outer ends of the pin 21 of the nipple 22, to establish a detachable connection between the coupling member and the nipple. The sleeve 15 has formed therein an annular groove 23, for receiving the inner unthreaded end portion of the sleeve 19. It is also provided with an annular flange 24, which forms a valve seat for the valve 25. The valve 25 is provided with a hollow valve stem 26, which projects loosely through the opening of the valve seat 24, and has secured to its outer end a washer 27, which acts as a follower for the cup leather or gasket 28. The walls of the hollow valve stem 26 are provided with apertures 29 for establishing communication between the interior of the valve stem and the space around the valve stem. The opening 30 in the gasket 28 registers with the bore of the valve stem and the opening in the end of the nipple.

To seal the connection between the two sleeves 15 and 19 I provide a cup-shaped gasket 31. A spiral spring 32 extends between the gasket 31 and the washer 27, and serves to hold the gasket 31 against the flange 24, and at the same time tends to hold the valve 25 in its closed position. It will be noted that the sleeve 19 is provided with a shoulder 33, which limits the outward movement of the gasket 28 under the influence of the spring 32.

The outer end of the nipple 22 is provided with an inwardly extending flange 34, which forms a seat for the closure 35. The closure 35 is yieldingly held on its seat by a spiral spring 36, which is supported by the pin 21. The details of construction of the nipple are clearly illustrated and described in the patent to Gullborg, referred to above. One side of the transversely extending portion of each bayonet slot 20 is provided with a recess 37 for receiving the pin 21 and preventing the rotation of the sleeve 19 relatively to the nipple.

I preferably make the screw threaded connection between the two sleeves 15 and 19 a double threaded one to increase the strength of this connection, and at the same time increase the pitch of the threads, so that I can obtain a comparatively large longitudinal movement of the sleeve 19, relative to the sleeve 15, with a comparatively small angular movement of the latter sleeve. To prevent the sleeve 19 from being withdrawn from the sleeve 15 I provide a set screw 38, which is adapted to engage with the screw threads of the sleeve 19.

To connect a coupling member of my improved lubricating system with a nipple 22, the longitudinally extending portions of the bayonet slots 20 are brought into registry with the opposite ends of the pin 21. The sleeve 19 is then moved longitudinally of the nipple until the end of the nipple engages the gasket 28, at which time the ends of the pin 21 will be in alinement with the transversely extending portions of the bayonet slots. The sleeve 15 is then rotated in a clockwise direction, the threads preferably being right-handed threads. The sleeve 19 will thereupon rotate through a slight arc until the ends of the bayonet slots come into contact with the ends of the pin 21, whereupon further rotation of the sleeve 19 will be prevented. The operator continues the rotation of the sleeve 15, thereby causing this sleeve, by reason of the screw threaded connection with the sleeve 19, to move outwardly upon the sleeve 19. The valve 25 during this movement is held stationary with respect to the nipple 22, because of the contact between the gasket 28 and the end of the nipple, and consequently the movement of the sleeve 15 outwardly upon the sleeve 19 causes the valve seat to move away from the valve 25. The compressor can then be operated to force the lubricant between the valve 25, and its seat, through the apertures in the valve stem walls, and through the valve stem into the nipple past the closure 35, which will be opened by the pressure of the lubricant. After sufficient lubricant has been supplied to the bearing, by rotating the sleeve 15 in a counter-clockwise direction the operator will first cause the valve seat to be moved into closing contact with the valve 25. After the closing of the valve upon its seat, the continued rotation of the sleeve 15 in a counter-clockwise direction will, in the absence of sufficient friction between the screw threaded portions of the two sleeves 15 and 19, bring the inner end of the set screw 38 into contact with the adjacent screw thread on the sleeve 19, whereupon by continuing still further the rotation of the sleeve 15 the sleeve 19 will be turned in a counter-clockwise direction to bring the longitudinally extending portions of the slots 20 into registry with the ends of the pin 21, whereupon the coupling member can be withdrawn from the nipple. The coupling member can thereupon be transferred and attached to another nipple without the necessity of relieving the pressure on the lubricant in the compressor as a comparatively steep pitch of the screw threads connecting the two sleeves gives the operator sufficient advantage to overcome the pressure of the lubricant in opening the valve 25 without undue exertion on his part. It will also be clear that whenever the coupling member is detached from the nipple, the valve 25 will be closed, thereby preventing any discharge of lubricant from the coupling member.

While I have described the details of the preferred embodiment of my invention, it is to be clearly understood that my invention is not limited to these details, but is capable of other adaptations and modifications in the scope of the appended claims.

Having thus described my invention, what I claim is:

1. The combination with a lubricant receiving nipple, having a pin projecting from one side thereof, of means for supplying lubricant thereto, comprising a compressor having a coupling member for making a detachable connection with said nipple comprising a sleeve having a swivel connection with said compressor, and provided intermediate its ends with an annular flange forming a valve seat and the second sleeve having its inner end screw threaded into said first-mentioned sleeve, and its outer end provided with a bayonet slot for co-acting with said pin, a valve seating outwardly upon said valve seat, and having a valve stem projecting loosely through the opening of said valve seat, the said valve stem being hollow and having an opening through the wall thereof, a gasket secured to the outer end of said valve stem for seating against the end of said nipple, a second gasket seating against said flange and sealing the joint between said sleeves, and a compression spring for holding said gaskets in spaced relation.

2. The combination with a lubricant receiving nipple, of means for supplying lubricant thereto, comprising a compressor having a coupling member for making a detachable connection with said nipple comprising a sleeve having a swivel connection with said compressor, and provided intermediate its ends with an annular flange forming a valve seat and the second sleeve having its inner end screw threaded into said first-mentioned sleeve, and its outer end provided with means for making a detachable connection with said nipple, a valve seating outwardly upon said valve seat, and having a valve stem projecting loosely through the opening of said valve seat, the said valve stem being hollow and having an opening through the wall thereof, a gasket secured to the outer end of said valve stem for seating against the end of said nipple, and a compression spring for holding said valve closed.

3. The combination with a lubricant receptacle of means for supplying lubricant thereto, comprising a compressor having a coupling member for making a detachable connection with said receptacle, said coupling member comprising a sleeve swiveled upon said compressor, and having an inwardly extending annular flange forming a valve seat, a second sleeve for receiving said lubricant receptacle, having a screw threaded connection with said first-mentioned sleeve, and provided with means for holding it against longitudinal displacement relatively to said receptacle, a valve seating outwardly upon said seat, and having a stem projecting through the opening in said valve seat, a spring co-acting with said valve stem for closing said valve, a gasket for sealing the connection between said second sleeve and said lubricant receptacle, and a second gasket for sealing the joint between said sleeves.

4. The combination with a lubricant receptacle of means for supplying lubricant thereto, comprising a compressor having a coupling member for making a detachable connection with said receptacle, said coupling member comprising a sleeve, and having an inwardly extending annular flange forming a valve seat, a second sleeve for receiving said lubricant receptacle, having a screw threaded connection with said first-mentioned sleeve, and provided with means for holding it against longitudinal displacement relatively to said receptacle, a valve seating outwardly upon said seat, means for opening said valve when said lubricant receptacle enters said first-mentioned sleeve, and a gasket for sealing the connection between said second sleeve and said lubricant receptacle.

5. The combination with a lubricant receptacle of means for supplying lubricant thereto, comprising a compressor having a coupling member for making a detachable connection with said receptacle, said coupling member comprising two relatively movable sleeves, one of which is provided with means for making a detachable connection with said receptacle, and the other of which comprises a valve seat, a valve for controlling the flow of lubricant through said valve seat, means for moving said valve seat toward said receptacle by rotation of one of said sleeves and means for sealing the connection between said coupling member and said receptacle.

6. The combination with a lubricant receptacle of means for supplying lubricant thereto, comprising a compressor having a coupling member for making a detachable connection with said receptacle, said coupling member comprising two relatively movable sleeves, one of which is provided with means for making a detachable connection with said receptacle, and the other of which comprises a valve seat, a valve for controlling the flow of lubricant through said valve seat, means for opening said valve by rotation of one of said sleeves and means for sealing the connection between said coupling member and said receptacle.

7. The combination with a lubricant receptacle of means for supplying lubricant thereto, comprising a compressor having a coupling member for making a detachable connection with said receptacle, said coupling member comprising two relatively movable means, one of which is provided with means for making a detachable connection with said receptacle, and the other of which comprises a valve seat, a valve for controlling the flow of lubricant through said valve seat, means for opening said valve by rotation of one of said means, and means for sealing the connection between said coupling member and said receptacle.

8. The combination with a lubricant receptacle of means for supplying lubricant thereto, comprising a compressor having a coupling member for making a detachable connection with said receptacle, the said coupling member comprising two relatively movable members, a valve for controlling the flow of lubricant through said means, and means actuated by the rotation of one of said members relative to the other for making a detachable connection with said lubricant receptacle and opening and closing valve.

9. The combination with a lubricant receptacle of means for supplying lubricant thereto, comprising a compressor having a coupling member for making a quickly detachable connection with said receptacle, said coupling member comprising two relatively movable members a valve for controlling the passage of lubricant through said coupling member, means for moving said members toward each other for opening said valve, and means for sealing the connection between said lubricant receptacle and said coupling member before said valve is opened.

10. The combination with a lubricant receptacle of means for supplying lubricant thereto, comprising a compressor having a coupling member for making a quickly detachable connection with said receptacle, said coupling member comprising two relatively movable members, a valve for controlling the passage of lubricant through said coupling member, means for moving said members relatively to each other for opening said valve, and means for sealing the connection between said lubricant receptacle and said coupling member before said valve is opened.

11. The combination with a lubricant receptacle of means for supplying lubricant thereto, comprising a compressor for exerting pressure upon the lubricant contained therein, said compressor having a coupling member for making a quickly detachable connection with said lubricant receptacle, comprising a valve and means for successively connecting said coupling member with said lubricant receptacle, and opening said valve, of closing said valve and disconnecting said coupling member from said lubricant receptacle.

12. A lubricating system comprising a coupling member for making a quick detachable connection with another coupling member comprising two relatively movable sleeves, one of which is provided with a valve seat, a valve for co-acting with said valve seat, and means for moving said sleeves longitudinally relatively to each other for separating said valve and valve seat.

13. A lubricating system comprising a coupling member for making a quick detachable connection with another coupling member comprising two relatively movable telescoping means, one of which is provided with a valve seat, a valve for co-acting with said valve seat, and means for moving said means longitudinally relatively to each other for separating said valve and valve seat.

14. A lubricating system comprising a coupling member for making a quick detachable connection with another coupling member comprising a tubular member adapted to be connected with a conduit, a sleeve rotatably mounted upon said tubular member, and a second sleeve having a screw threaded connection with said first-mentioned sleeve, the outer end of said second sleeve being provided with means for making a quickly detachable connection with a second coupling member.

15. In a lubricating system the combination with a first coupling member of a second coupling member comprising a sleeve for receiving said first coupling member, the said sleeve and first coupling member being provided with co-acting means for forming a quickly detachable connection, a valve for said second coupling member, and means for co-acting with said sleeve for opening said valve after said sleeve has been connected with said first coupling member.

16. The combination with a lubricant receptacle of a compressor for supplying lubricant thereto, having a coupling member comprising a sleeve for receiving one end of said lubricant receptacle, said sleeve and lubricant receptacle having co-acting means for securing said sleeve to said lubricant receptacle upon rotation of said sleeve relatively to said lubricant receptacle, a perforated gasket slidably mounted in said sleeve for making a sealed connection with the end of said lubricant receptacle, a hollow valve stem communicating with the perforation in said gasket and projecting inwardly from said gasket, a valve carried by the inner end of said valve stem, a second sleeve having a portion extending into said first-named sleeve and having an annular flange forming a valve seat for co-acting with said valve, a spring interposed between said annular flange and gasket and surrounding said valve stem for yieldingly urging said gasket toward said lubricant receptacle, and a connection between said sleeve for moving said sleeves toward each other when said sleeves are rotated in one direction relatively to the other and for moving said sleeves away from each other when said sleeves are rotated in the opposite direction relatively to each other, the inner face of said gasket being subjected to the pressure of the lubricant in said coupling.

17. The combination with a lubricant receptacle of a compressor for supplying lubricant thereto, having a coupling member comprising a sleeve for receiving one end of said lubricant receptacle, said sleeve and lubricant receptacle having co-acting means for securing said sleeve to said lubricant receptacle upon rotation of said sleeve relatively to said lubricant receptacle, a perforated gasket slidably mounted in said sleeve for making a sealed connection with the end of said lubricant receptacle, a hollow valve stem communicating with the perforation in said gasket and projecting inwardly from said gasket, a valve carried by the inner end of said valve stem, a second sleeve having an annular flange forming a valve seat for co-acting with said valve, a spring interposed between said annular flange and gasket for yieldingly urging said gasket toward said lubricant receptacle, and a connection between said sleeves for moving said sleeves toward each other when said sleeves are rotated in one direction relatively to the other and for moving said sleeves away from each other when said sleeves are rotated in the opposite direction relatively to each other.

18. A coupling member comprising a sleeve, a perforated gasket slidably mounted in said sleeve, a hollow valve stem communicating with the perforation in said gasket and projecting inwardly from said gasket, a valve carried at the inner end of said valve stem, a second sleeve having a valve seat for co-acting with said valve, a spring interposed between said valve seat and said gasket for urging said gasket outwardly, and connecting means between said sleeves for moving said sleeves toward each other when said sleeves are rotated in one direction relatively to the other and for moving said sleeves away from each other when said sleeves are rotated in the opposite direction relatively to each other.

19. A coupling member comprising two relatively movable sleeves communicating with each other, one of said sleeves having a valve seat formed therein, a valve for closing said seat, a gasket slidably mounted in one of said sleeves and subjected to the pressure of the fluid therein, said gasket being perforated to permit the passage of fluid therethrough, means actuated by said gasket for opening said valve when said sleeves are moved toward each other, and connecting means between the said sleeves for moving them toward each other upon rotation of one sleeve relatively to the other.

20. A unitary coupling member comprising two relatively movable sleeves communicating with each other, one of said sleeves having a valve seat formed therein, a valve for closing said seat, a gasket slidably mounted in one of said sleeves, said gasket being perforated to permit the passage of fluid therethrough, means actuated by said gasket for opening said valve when said sleeves are moved toward each other, and connecting means between the said sleeves for moving them toward each other.

21. A unitary coupling member comprising two relatively movable sleeves communicating with each other, one of said sleeves having a valve seat formed therein, a valve for closing said seat, a gasket slidably mounted in one of said sleeves, said gasket being perforated to permit the passage of fluid therethrough, and means actuated by said gasket for opening said valve when said sleeves are moved toward each other.

22. A unitary coupling member comprising two relatively movable sleeves communicating with each other, one of said sleeves having a valve seat formed therein, a valve for closing said seat, a gasket slidably mounted in one of said sleeves, said gasket being perforated to permit the passage of fluid therethrough, and means for opening said valve when said sleeves are moved toward each other.

23. A lubricant compressor provided with a discharge conduit having a unitary coupling member comprising two sleeves in communication with each other, one of said sleeves having means for making a connection with a lubricant receptacle, a gasket in said last-named sleeve for sealing said connection, a valve seat and valve for controlling communication between said sleeves, and means for moving one of said sleeves toward the other for opening said valve.

24. The combination with a lubricant receptacle of a compressor for supplying lubricant thereto, comprising a coupling member, said lubricant receptacle and coupling member having co-acting means for connecting said lubricant receptacle and coupling member upon an initial rotation of said coupling member relatively to said lubricant receptacle, a valve controlling the flow of lubricant from said compressor to said lubricant receptacle, and means for opening said valve upon continued rotation of said coupling member relatively to said lubricant receptacle.

25. The combination with a lubricant receptacle of a compressor for supplying lubricant thereto, comprising a coupling member, co-acting means on said lubricant receptacle and coupling member for connecting said lubricant receptacle and coupling member upon initial movement of said coupling member relatively to said lubricant receptacle, a valve for controlling the discharge of lubricant from said compressor, and means for opening said valve upon continued movement of said coupling member relatively to said lubricant receptacle.

In witness whereof, I hereunto subscribe my name this 25th day of May, 1920.

ERNEST W. DAVIS.

Witnesses:
ANDREW WINTERCORN,
EDNA GUSTAFSON.